(12) United States Patent
Takahashi

(10) Patent No.: US 6,536,962 B2
(45) Date of Patent: Mar. 25, 2003

(54) FOCAL-PLANE SHUTTER FOR DIGITAL STILL CAMERAS

(75) Inventor: Shigemi Takahashi, Nerima-ku (JP)

(73) Assignee: Nidec Copal Corporation, Tokyo (JP)

(*) Notice: Subject to any disclaimer, the term of this patent is extended or adjusted under 35 U.S.C. 154(b) by 0 days.

(21) Appl. No.: 09/988,395

(22) Filed: Nov. 19, 2001

(65) Prior Publication Data

US 2002/0064388 A1 May 30, 2002

(30) Foreign Application Priority Data

Nov. 24, 2000 (JP) ........................... 2000-362685

(51) Int. Cl.⁷ ............................... G03B 17/02
(52) U.S. Cl. ................ 396/466; 396/470; 396/484; 396/489; 348/362
(58) Field of Search ................ 396/483, 484, 396/489, 463, 465, 466, 469, 470; 348/362

(56) References Cited

U.S. PATENT DOCUMENTS

| | | | | |
|---|---|---|---|---|
| 4,364,654 A | * | 12/1982 | Senuma et al. | 396/466 |
| 4,540,260 A | * | 9/1985 | Nakano | 396/489 |
| 5,333,025 A | * | 7/1994 | Dowe | 396/469 |
| 5,659,821 A | * | 8/1997 | Kawakita et al. | 396/248 |

FOREIGN PATENT DOCUMENTS

| | | |
|---|---|---|
| JP | 4-346324 | 12/1992 |
| JP | 6-194717 | 7/1994 |
| JP | 8-88986 | 4/1996 |
| JP | 11-326992 | 11/1999 |
| JP | 2000-147597 | 5/2000 |

* cited by examiner

Primary Examiner—David M. Gray
(74) Attorney, Agent, or Firm—Pillsbury Winthrop LLP

(57) ABSTRACT

A focal-plane shutter for digital still cameras includes a first blade covering an exposure aperture only immediately before an exposure operation is performed; a driving member for the first blade having an iron piece member, actuated in an exposure operation; an electromagnet for the first blade for attracting and retaining the iron piece member of the driving member for the first blade and actuating the driving member for the first blade; a cocking member for the first blade, actuating the driving member for the first blade when actuated from the initial position to the cocked position and actuated from the cocked position to the initial position only immediately after the current is supplied to the electromagnet for the first blade; a second blade covering the exposure aperture when the power is turned off and immediately after the exposure operation is completed; a driving member for the second blade having an iron piece member, actuated in the exposure operation; an electromagnet for the second blade for attracting and retaining the iron piece member of the driving member for the second blade and actuating the driving member for the second blade; and a cocking member for the second blade actuating the driving member for the second blade when actuated from the initial position to the cocked position, and actuated from the cocked position to the initial position only immediately after the current is supplied to the electromagnet for the second blade and when the power is turned off.

4 Claims, 6 Drawing Sheets

FOCAL-PLANE SHUTTER FOR DIGITAL STILL CAMERAS

BACKGROUND OF THE INVENTION

1. Field of the Invention

This invention relates to a focal-plane shutter for digital still cameras which is designed to actuate a first blade and a second blade in turn in the same direction when photographing is performed and to expose an imaging surface through a slit provided by both blades.

2. Description of Related Art

In focal-plane shutters used in digital still cameras, some types of shutters are known in accordance with the specifications of cameras. One of them, like a focal-plane shutter used in a film camera, is equipped with a first blade and a second blade, which are actuated in turn at predetermined timing so that an imaging surface is exposed continuously from one side thereof to the other through a slit provided by the blades.

Digital still cameras using shutters constructed as mentioned above are divided into two classes, those in which an optical finder is provided as in the film camera so that the imaging surface is covered by at least one of the first blade and the second blade, except for the case where photographing is performed, and those, having finders referred to as electronic view finders, in which the entire surface in an exposure aperture is exposed to light from an object so that an image of the object can be observed through a monitor, even when photographing is not performed. Thus, the latter camera is such that, in photography, the first blade is moved to the position (a cocked position) where the imaging surface is covered, and then an exposure operation is performed.

In the film camera, the area of the imaging surface is usually larger than that of the digital still camera. The film camera always has the optical finder. Due to the arrangement of an optical system and the placement of a film, each of the first blade and the second blade is composed of a plurality of blade components to achieve compactness of a shutter unit. However, in the digital still camera, particularly provided with the electronic view finder, each of the first blade and the second blade need not necessarily be constructed with a plurality of blade components, and is also known to have a single blade component. An example of a shutter constructed from such a viewpoint is set forth in Japanese Patent Preliminary Publication No. Hei 11-326992.

As is well known, a digital still camera equipped with an electronic view finder is such that when the power of the camera is turned on, light from an object strikes the imaging surface even in the case where photographing is not performed at once, and a finder function is obtained. Thus, when the camera is not used and the power is turned off, it is convenient for the next use of the camera to keep a state where the imaging surface is not covered. In an image sensor such as a CCD, however, when the imaging surface is exposed to the light for a long time period, its performance of photoelectric conversion is degraded even though the image sensor is not energized. Hence, it is desired that when the power is turned off, the imaging surface is prevented from striking the light.

In order to do so, it is conceivable that a lens cap is provided and is mounted and dismounted each time the camera is used. However, this is very cumbersome, and in addition, there is the fear that the lens cap may be lost. Thus, in order to avoid such problems, it is also conceivable that a lens barrier is provided. In a camera constructed so that its lens barrel protrudes from the camera body, however, the structure of the lens barrier is not mechanically easy and is unfavorable for design and cost. In contrast to this, for a digital camera equipped with a shutter, when the camera is not used, the shutter can be held closed and hence the above problems are solved.

In the camera equipped with the shutter, however, in order to obtain the function described above, it is necessary that when the power is turned on, the shutter is brought into an open state from a closed state, and it is closed once in photography to perform an opening and closing operation and is brought again into the open state after photography. Moreover, when the power is turned off, there is the need to perform the operation that the shutter is brought into the closed state from the open state. In a lens shutter which does not require a very high shutter speed, this operation is achieved with comparative ease when the opening and closing operation is performed directly by forwarding and reversing a motor.

However, in a focal-plane shutter having a first blade and a second blade, constructed so that, in order to achieve a high shutter speed in an exposure operation, a driving member for the first blade and a driving member for the second blade which are connected to the first blade and the second blade, respectively, are actuated in turn by individual driving springs, it is not easy that these driving members and cocking members for moving the driving members to cocked positions are constructed so that the opening and closing operation mentioned above is favorably performed. Furthermore, such a structure requires spaces for incorporating the first blade and the second blade which are narrower than those set forth in Hie 11-326992.

SUMMARY OF THE INVENTION

It is, therefore, an object of the present invention to provide a focal-plane shutter for digital still cameras in which the first blade and the second blade are actuated in turn by individual driving springs as driving sources in photography to expose the imaging surface through a slit provided by these blades, and when the power of a camera is turned off, the imaging surface is covered by the first blade or the second blade, while when the power is turned on, the imaging surface is exposed, except for photography, and in which areas for incorporating the first blade and the second blade are small.

In order to achieve the above object, the focal-plane shutter for digital still cameras of the present invention includes a first blade covering an exposure aperture only immediately before an exposure operation is performed, after release, but removed from the exposure aperture in other cases even when the power of a camera is turned off; a driving member for the first blade having an iron piece member, connected to the first blade and actuated by the biasing force of a driving spring for the first blade in an exposure operation; an electromagnet for the first blade for attracting and retaining the iron piece member of the driving member for the first blade by the supply of current immediately after the release and actuating the driving member for the first blade by the driving spring for the first blade when the current is interrupted; a cocking member for the first blade whose actuation is controlled between its initial position and cocked position by a first motor, actuating the driving member for the first blade against the biasing force of the driving spring for the first blade when actuated from the initial position to the cocked position, and actuated from the cocked position to the initial position only immediately after the current is supplied to the electromagnet for the first blade; a second blade covering the exposure aperture when the power is turned off and immediately after the exposure operation is completed, but removed from the exposure aperture in other cases; a driving member for the second blade having an iron piece member, connected to the second blade and actuated by the biasing force of a driving spring for the second blade in the exposure operation; an electromagnet for the second blade for attracting and retaining the iron piece member of the driving member for the second blade by the supply of current immediately after the release and actuating the driving member for the second blade by the driving spring for the second blade when the current is interrupted; and a cocking member for the second blade whose actuation is controlled between its initial position and cocked position by a second motor, actuating the driving member for the second blade against the biasing force of the driving spring for the second blade when actuated from the initial position to the cocked position, and actuated from the cocked position to the initial position only immediately after the current is supplied to the electromagnet for the second blade and when the power of the camera is turned off.

Further, the focal-plane shutter for digital still cameras of the present invention includes a first blade covering an exposure aperture immediately before an exposure operation is performed and when the power of a camera is turned off, after release, but removed from the exposure aperture in other cases; a driving member for the first blade having an iron piece member, connected to the first blade and actuated by the biasing force of a driving spring for the first blade in an exposure operation; an electromagnet for the first blade for attracting and retaining the iron piece member of the driving member for the first blade by the supply of current immediately after the release and actuating the driving member for the first blade by the driving spring for the first blade when the current is interrupted; a cocking member for the first blade whose actuation is controlled between its initial position and cocked position by a first motor, actuated from the initial position to the cocked position immediately before the exposure operation is performed and when the power of the camera is turned off, after the release, to actuate the driving member for the first blade against the biasing force of the driving spring for the first blade and actuated from the cocked position to the initial position when the power of the camera is turned on and immediately after the current is supplied to the electromagnet for the first blade; a second blade covering the exposure aperture only immediately after the exposure operation is completed, but removed from the exposure aperture in other cases even when the power is turned off; a driving member for the second blade having an iron piece member, connected to the second blade and actuated by the biasing force of a driving spring for the second blade in the exposure operation; an electromagnet for the second blade for attracting and retaining the iron piece member of the driving member for the second blade by the supply of current immediately after the release and actuating the driving member for the second blade by the driving spring for the second blade when the current is interrupted; and a cocking member for the second blade whose actuation is controlled between its initial position and cocked position by a second motor, actuating the driving member for the second blade against the biasing force of the driving spring for the second blade when actuated from the initial position to the cocked position, and actuated from the cocked position to the initial position only immediately after the current is supplied to the electromagnet for the second blade.

When the focal-plane shutter for digital still cameras mentioned above is designed to have a first sensor for detecting the working position of the cocking member for the first blade to stop the rotation of the first motor and a second sensor for detecting the working position of the cocking member for the second blade to stop the rotation of the second motor, this is favorable in the case where each of the first and second motors is a DC motor.

Further, when the focal-plane shutter for digital still cameras mentioned above is designed to have a first switch for synchro flash operated at the final stage of the exposure operation of the driving member for the first blade by the driving member for the first blade and a second switch for synchro flash operated at the initial stage of the exposure operation of the driving member for the second blade by the driving member for the second blade and to perform flash photographing by a proper choice between these switches, the flash photographing can be widely performed.

This and other objects as well as the features and advantages of the present invention will become apparent from the following detailed description of the preferred embodiment when taken in conjunction with the accompanying drawings.

DETAILED DESCRIPTION OF THE PREFERRED EMBODIMENT

Figure 1:
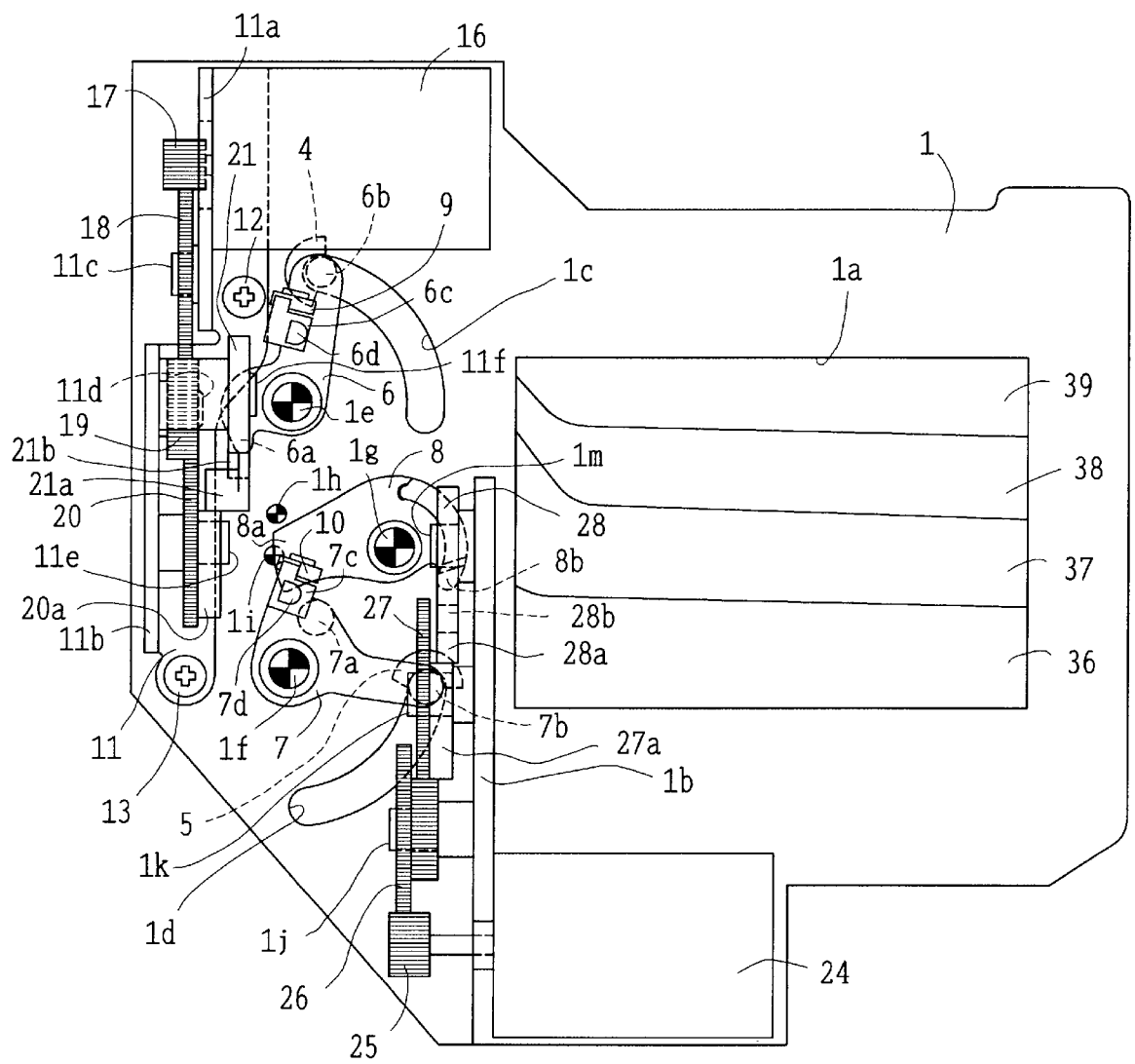
FIG. 1 is a plan view showing an embodiment of the focal-plane shutter for digital still cameras of the present invention, viewed from the object side, that is, the photographing lens side, immediately after an exposure operation is completed.

In accordance with the embodiment shown in the drawings, the present invention will be described below. The embodiment, as will be often seen in focal-plane shutters for film cameras, is constructed as a direct type focal-plane shutter in which each of the first blade and the second blade is provided with a plurality of blade components. Specifically, the shutter of this type is constructed so that immediately before the exposure operation is started, the iron piece member of the driving member for the first blade and the iron piece member of the driving member for the second blade are attracted and retained by the electromagnet for the first blade and the electromagnet for the second blade, respectively. However, the construction that the driving member for the first blade and the driving member for the second blade are retained at the position where the exposure operation is started, immediately before the exposure aperture is started, is also known by a shutter referred to as a locking type. The present invention is applicable to the shutter of such a type. In the focal-plane shutter for digital still cameras, each of the first blade and the second blade, as mentioned above, may be constructed with only a single blade component. The present invention is also applicable to the shutter of this structure.

Figure 2:
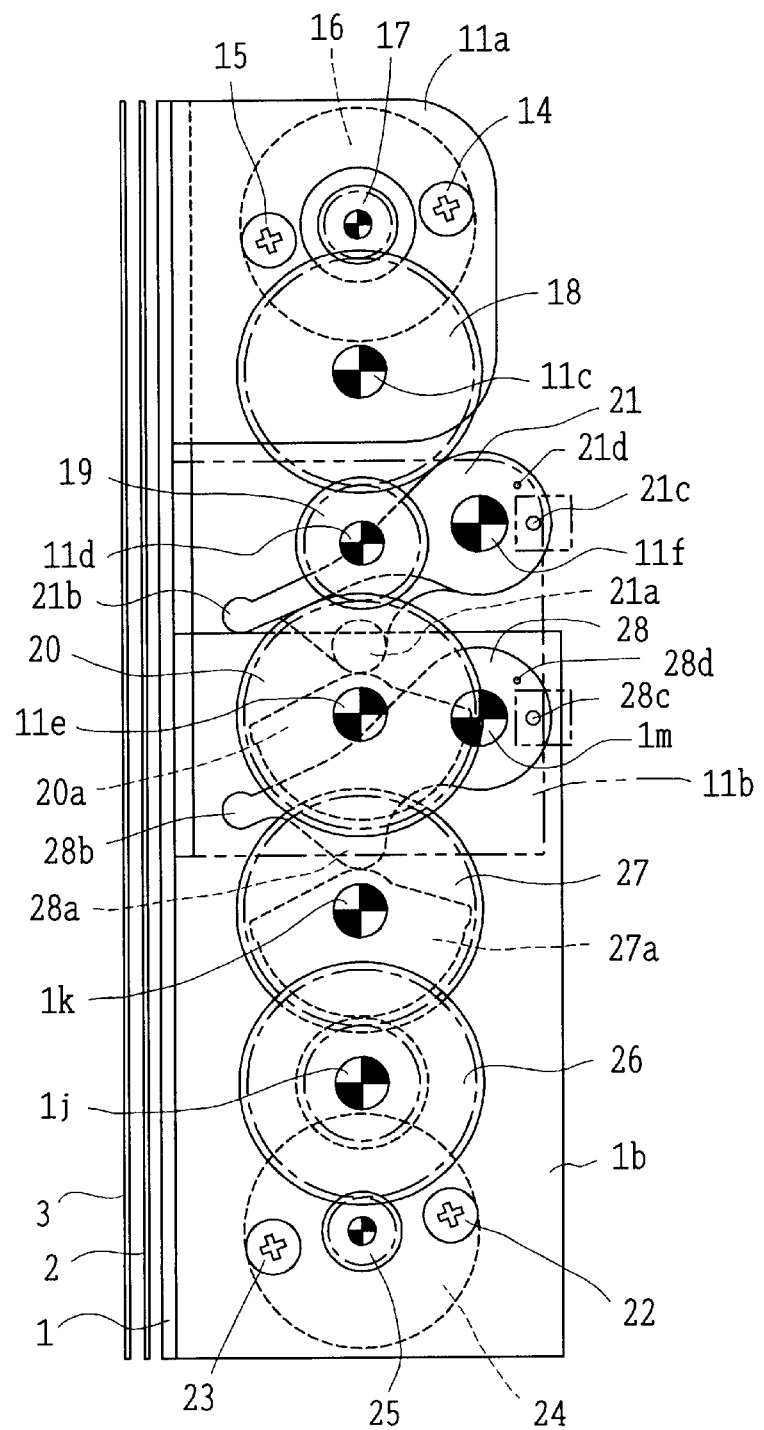
FIG. 2 is a side view showing the focal-plane shutter viewed from the left hand of FIG. 1.
Figure 3:
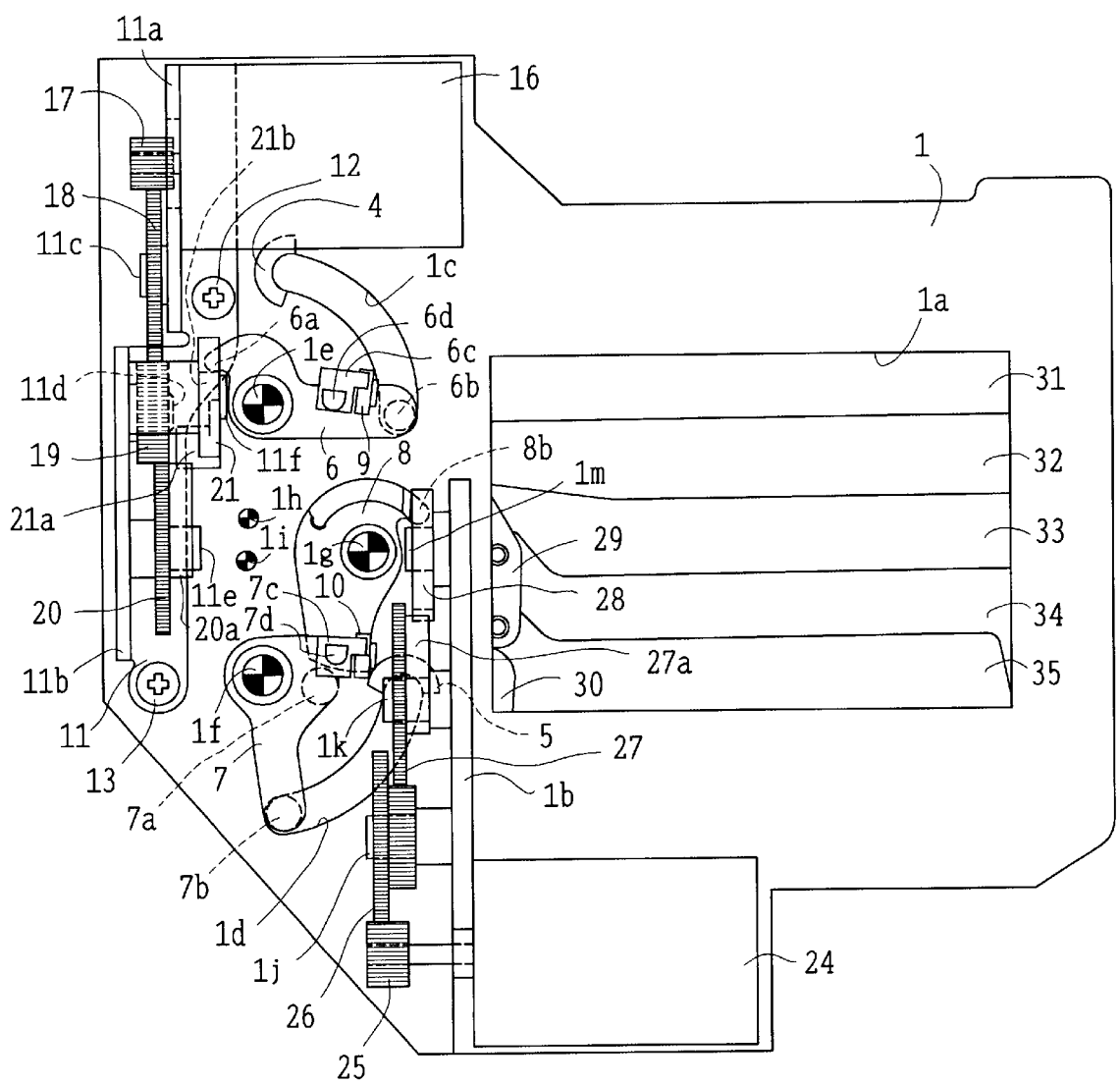
FIG. 3 is a plan view showing the embodiment, viewed in the same manner as in FIG. 1, in a cocking condition.

The structure of the embodiment is first explained. In FIGS. 1 and 3, the object side of individual members is conveniently referred to as a surface side, and the image sensor (such as a CCD) side as a back side. A shutter base plate 1 of the embodiment, made of synthetic resin, is provided with an aperture 1a of a rectangle elongated in a lateral direction at about the middle thereof and has a wall 1b integrally configured perpendicular to the shutter base plate 1 and extending straight and downward on the left side of the aperture 1a. As shown in FIG. 2, an intermediate plate 2 and an auxiliary plate 3 are mounted, a predetermined distance apart, on the back side of the shutter base plate 1. A blade chamber for the first blade is provided between the shutter base plate 1 and the intermediate plate 2, and a blade chamber for the second blade is provided between the intermediate plate 2 and the auxiliary plate 3. In the intermediate plate 2 and the auxiliary plate 3, apertures similar to the aperture 1a are also provided, one for each plate, and usually these three apertures are superposed to restrict the exposure aperture as a photographing image frame. However, the embodiment is described on the premise that the configuration of the aperture 1a restricts the exposure aperture.

Furthermore, on the surface side of the shutter base plate 1, a supporting plate and a printed wiring board, such as those set forth in Japanese Patent Preliminary Publication No. 2000-147597, are mounted in the left-hand area of the aperture 1a, at a predetermined distance away from the shutter base plate 1, by a proper means. In order to attract and retain an iron piece member 9 of a driving member 6 for the first blade and an iron piece member 10 of a driving member 7 for the second blade which will be described later, an electromagnet for the first blade and an electromagnet for the second blade are attached to the supporting plate on the side of the shutter base plate 1, but they are omitted from the figures. Although two switches actuated by operating portions 6d and 7d to be described later, mounted to the driving members 6 and 7, are provided on the printed wiring board, these switches are also omitted from the figures.

Two arcuate slots 1c and 1d are provided on the shutter base plate 1. At the upper ends of these slots, shock absorbing members 4 and 5 made of butyl rubber, each having a planar shape of the letter C, are mounted in a well-known fashion. The shutter base plate 1 has two shafts 1e and 1f passing through the shutter base plate 1 and set upright on both the surface side and the back side, a shaft 1g set upright only on the surface side, and two shafts 1h and 1i set upright only on the back side. On the surface side, the driving member 6 for the first blade and the driving member 7 for the second blade are rotatably mounted to the shaft 1e and 1f, respectively, and an intermediate member 8 is rotatably mounted to the shaft 1g. The driving member 6 for the first blade and the driving member 7 for the second blade are biased by individual springs, not shown, so that they are rotated counterclockwise. The intermediate number 8 is biased by a spring, not shown, so that it is rotated in a clockwise direction.

The driving member 6 for the first blade and the driving member 7 for the second blade have portions 6a and 7a to be pressed, driving pins 6b and 7b, and mounting portions 6c and 7c, respectively. The operating portions 6d and 7d are provided on the surface side of the mounting portions 6c and 7c, respectively, so that the two switches mounted on the printed wiring board, not shown, are separately actuated. The driving pins 6b and 7b provided on the back side pass through the slots 1c and 1d to extend to the blade chambers, and their root edges abut on the shock absorbing members 4 and 5 to stop the driving members 6 and 7 from rotating counterclockwise. Moreover, as is well known, the iron piece members 9 and 10 are attached to the mounting portions 6c and 7c, respectively, so that they are attracted and retained by individual corresponding electromagnets, not shown. The intermediate member 8 has a pressing portion 8a pushing the portion 7a to be pressed, of the driving member 7 for the second blade and a portion 8b to be pressed, pushed by a pressing portion 28b of a cocking member 28 for the second blade which will be mentioned later, so that its clockwise rotation is stopped by a stopper, not shown.

Each of the two switches mentioned above is a synchro switch for flash photographing. One switch actuated by the operating portion 6d of the driving member 6 for the first blade is brought into an on condition through timing where flash light reaches a peak at the instant that the aperture 1a is fully opened by the first blade in the exposure operation, or immediately after that, while the other switch actuated by the operating portion 7d of the driving member 7 for the second blade is brought into the on condition through timing where the flash light reaches a peak before the second blade is actuated and then starts to close the aperture 1a in the exposure operation. Whereby, when flash photographing is performed, a photographer can choose a desired flash mode before photographing.

On the surface side of the shutter base plate 1, a mounting member 11 is fixed by two screws 12 and 13. The mounting member 11 has two walls 11a and 11b perpendicular to the shutter base plate 1, and to facilitate the comprehension of figures, the wall 11b is indicated by a two-dot chain line in FIGS. 2 and 4. As will be seen from FIGS. 2 and 4, a motor 16 is attached to the wall 11a by two screws 14 and 15, and a gear 17 is fixed to its output shaft. Although the motor 16 is a DC motor, a step motor may be used. A gear 18 engaged with the gear 17 is rotatably mounted to a shaft 11c set upright on the wall 11a.

Shafts 11d, 11e, and 11f are set upright on the wall 11b. Although a gear 19 engaged with the gear 18 is rotatably mounted to the shaft 11d, and a gear 20 engaged with the gear 19 is rotatably mounted to the shaft 11e, a cam 20a having a planar shape of a sector and a circumference configured as a cam surface is constructed integrally with the gear 20. A cocking member 21 for the first blade is rotatably mounted to the shaft 11f and is biased by a spring, not shown, so that it is rotated counterclockwise in FIGS. 2 and 4. The cocking member 21 for the first blade has a portion 21a to be pressed, a pressing portion 21b, a major hole 21c, and a minor hole 21d so that the portion 21a to be pressed is brought into contact with the cam 20a of the gear 20 and the pressing portion 21b is capable of pressing the portion 6a to be pressed, of the driving member 6 for the first blade. Furthermore, in FIGS. 2 and 4, an optical sensor (photocoupler) is provided at the position of a square indicated by a two-dot chain line on the wall 11b, and thus the degrees of amounts of light transmitted through the holes 21c and 21d of the cocking member 21 for the first blade can be detected.

Although a motor 24 is attached to the wall 1b of the shutter base plate 1 by two screws 22 and 23, this motor 24 is also the DC motor, and a gear 25 is fixed to its output shaft. Shafts 1j, 1k, and 1m are set upright on the wall 1b, and a pair of gears 26 are rotatably mounted to the shaft 1j so that a main gear meshes with the gear 25. A gear 27 meshing with a pinion of the pair of gears 26 is rotatably mounted to the shaft 1k, and a cam 27a of the same shape as the cam 20a is configured integrally with the gear 27.

Figure 4:
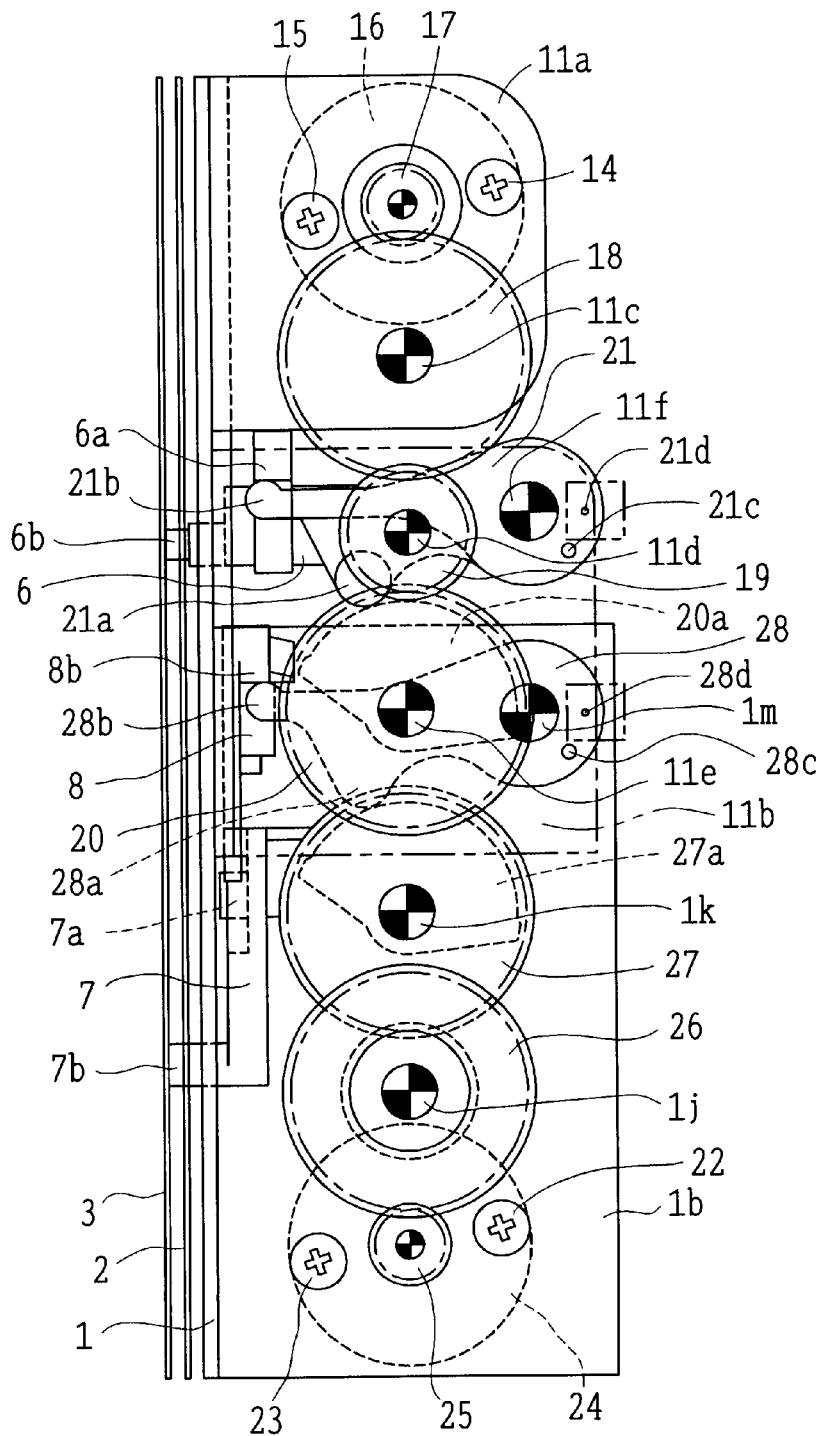
FIG. 4 is a side view showing the focal-plane shutter viewed from the left hand of FIG. 3.

The cocking member 28 for the second blade is rotatably mounted to the shaft 1m and is biased by a spring, not shown, so that it is rotated counterclockwise in FIGS. 2 and 4. The cocking member 28 for the second blade has a portion 28a to be pressed, the pressing portion 28b, a major hole 28c, and a minor hole 28d so that the portion 28a to be pressed is brought into contact with the cam 27a of the gear 27 and the pressing portion 28b is capable of pressing the portion 8b to be pressed, of the intermediate member 8. Furthermore, in FIGS. 2 and 4, an optical sensor (photocoupler) is provided at the position of a square indicated by a chain line on the wall 1b, and thus the degrees of amounts of light transmitted through the holes 28c and 28d of the cocking member 28 for the second blade can be detected.

Subsequently, reference is made to the structures of the first blade and the second blade, mounted on the back side of the shutter base plate 1. The first blade and the second blade of the embodiment have no special structures. Thus, for simplicity, the details of these blades are not shown in the figures. The first blade, as shown in FIG. 3, includes two arms 29 and 30 rotatably mounted to the shafts 1e and 1h, respectively, of the shutter base plate 1 and five blade components 31, 32, 33, 34, and 35 pivotally supported in turn along a longitudinal direction of the arms. The blade component 35 pivotally supported at a foremost place serves as a slit-forming blade component. The arm 29 of the first blade is provided with a well-known slot, into which the driving pin 6b of the driving member 6 for the first blade is fitted.

On the other hand, the second blade, which is exactly the same in structure as the first blade, is placed in a state where the first blade is back to front. In FIG. 1, therefore, two arms rotatably mounted to the shafts 1f and 1i of the shutter base plate 1 are placed on the reverse side of four blade components 36, 37, 38, and 39 pivotally supported in turn along a longitudinal direction of the arms and will not be seen at all. The blade component 39 pivotally supported at a foremost place serves as a slit-forming blade component. The arm pivotally mounted to the shaft 1f is provided with a slot, into which the driving pin 7b of the driving member 7 for the second blade is fitted.

Figure 5:
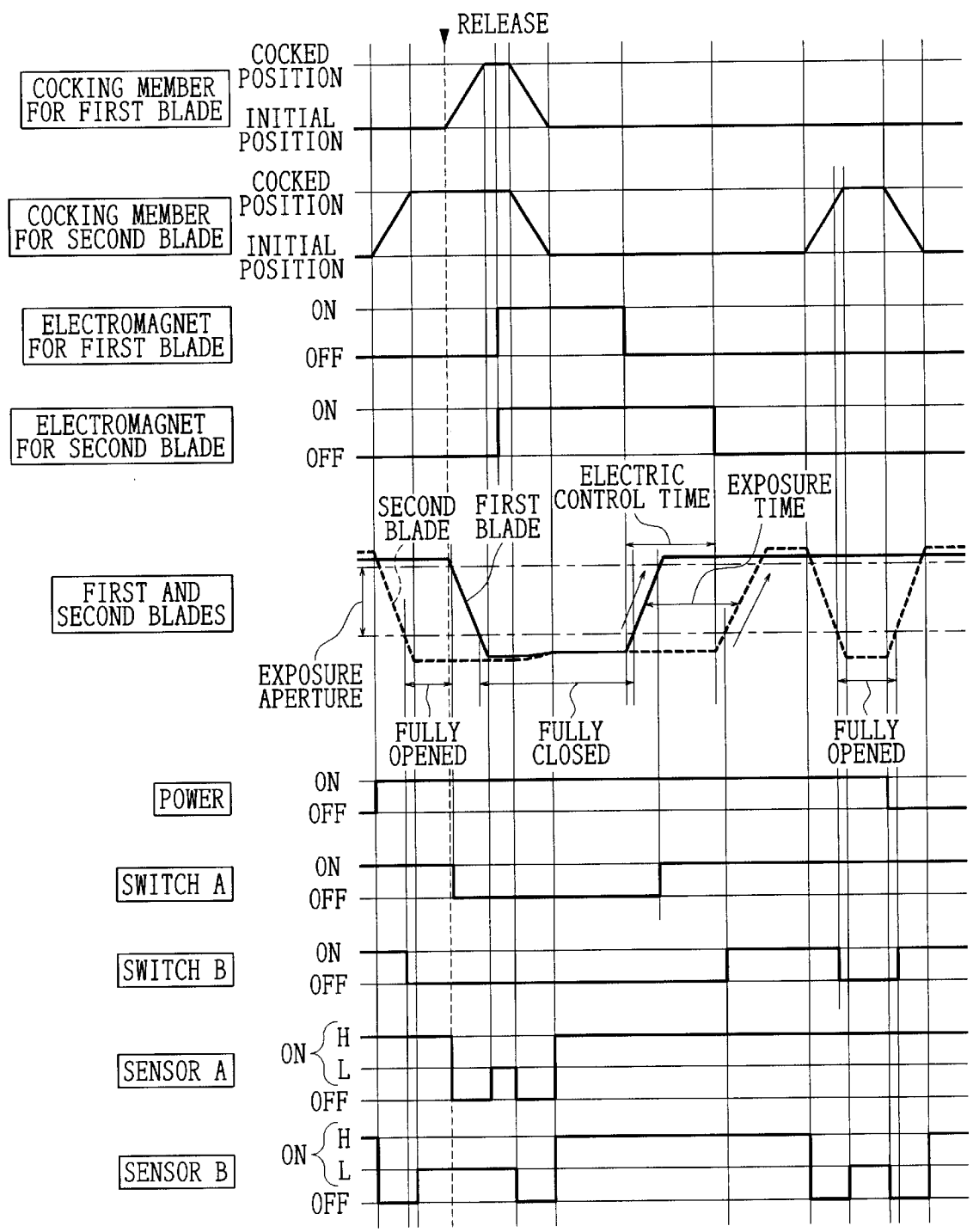
FIG. 5 is a timing chart for facilitating a comprehension of the operation of the embodiment.

Using the timing chart of FIG. 5, the operation of the mechanism shown in FIGS. 1–4 will be explained below. In FIG. 1, a state brought about immediately after the exposure operation is completed is shown, but in the explanation of this operation, a state where a camera is not used and the power is turned off is shown. The focal-plane shutter in this case is used in a camera applying an electronic view finder. Thus, it is generally desirable that the aperture 1a is fully opened, except for photography. In this case, however, when the power is in an off condition, as seen from FIG. 1, the aperture 1a is covered with the four blade components 36–39 of the second blade so that unnecessary degradation of the performance of photoelectric conversion of the image sensor is suppressed without providing the lens cap or the lens barrier.

In FIGS. 1 and 2, the two switches connected to the printed wiring board, not shown, are brought into on conditions by the operating portion 6d of the driving member 6 for the first blade and the operating portion 7d of the driving member 7 for the second blade. However, when the power is turned off and is left as it is, a conducting state is not brought about as a matter of course. These switches are not shown in the figures, and hence, in the following description, the switch actuated by the operating portion 6d of the driving member 6 for the first blade is referred to as a switch A, while the switch actuated by the operating portion 7d of the driving member 7 for the second blade is referred to as a switch B. The same holds for the case of FIG. 5.

On the other hand, each of two optical sensors turned on or off by the cocking member 21 for the first blade and the cocking member 28 for the second blade is such that its light-emitting portion and light-receiving portion are opposite to each other, with each of the major holes 21c and 28c of the cocking members 21 and 28 between them, and when the light-emitting portion is emitted, light can be received. In the following description, the optical sensor turned on or off by the cocking member 21 for the first blade is termed a sensor A, while the optical sensor turned on or off by the cocking member 28 for the second blade is termed a sensor B. The same holds for the case of FIG. 5. In FIG. 5, a signal where light transmitted through each of the major holes 21c and 28c is detected is shown by an H level, while a signal where light transmitted through each of the minor holes 21d and 28d is detected is shown by an L level. Also, although the output signals of these sensors A and B are utilized as a plurality of control signals, they will be gradually understood in the following description.

In FIGS. 1 and 2, when the power is turned on, both the two switches A and B are brought into on conditions and both the two sensors A and B send H signals. In this case, however, even though the shutter is set so that either of the switches (A or B) is selected and flash photographing is performed, the circuit of the shutter is designed so that a flash is not emitted. On the other hand, the two sensors A and B send the H signals, and thereby when it is confirmed that each of the cocking member 21 for the first blade and the cocking member 28 for the second blade is located at the initial position, the current is supplied to the motor 24. Because of this conduction, the motor 24 rotates the gear 25 clockwise in FIG. 2, and thus the gear 27 is rotated clockwise through the pair of gears 26 for speed reduction. The cam 27a constructed integrally with the gear 27 pushes the portion 28a to be pressed, of the cocking member 28 for the second blade, and the cocking member 28 for the second blade located at the initial position in FIG. 2 is rotated in a clockwise direction against the biasing force of a spring, not shown. Hence, the H signal of the sensor B vanishes immediately.

Consequently, the intermediate member 8, whose portion 8b to be pressed is pushed by the pressing portion 28b of the cocking member 28 for the second blade, is rotated in a counterclockwise direction against the biasing force of a spring, not shown, in FIG. 1. However, immediately after this rotation is started, the portion 7a to be pressed, of the driving member 7 for the second blade is pushed by the pressing portion 8a, and thus the driving member 7 for the second blade is also rotated in a clockwise direction against the basing force of a driving spring, not shown. The second blade is therefore actuated by the driving pin 7b and starts to open the aperture 1a (namely the exposure aperture) by moving the blade components 36–39 downward. When the aperture 1a is fully opened, the switch B is actuated by the operating portion 7d of the driving member 7 for the second blade and is brought into an off condition. The position of rotation of the cocking member 28 for the second blade is detected through the minor hole 28d by the sensor B, and thereby the rotation of the motor 24 is stopped.

In this way, when the aperture 1a is fully opened, an image of an object can be observed through the electronic view finder. In a state where the rotation of the driving member 7 for the second blade is stopped, the iron piece member 10 comes in contact with the electromagnet for the second blade, not shown, but this electromagnet is not yet in a conducting state. For the cocking member 28 for the second blade, its cocked position refers to the case where the motor 24 is stopped in this way. In the embodiment, if the sensor B is not brought into an on condition through the minor hole 28d of the cocking member 28 for the second blade even when preset time has passed after the motor 24 is energized, a warning indication will be given on the assumption that some trouble is caused to the operation.

Subsequently, when a release button is pushed for photographing, the current is supplied to the motor 16 by a corresponding signal, and the gear 17 is actuated to rotate the gear 20 in a clockwise direction through the gears 18 and 19. Thus, the cam 20a constructed integrally with the gear 20 pushes the portion 21a to be pressed, of the cocking member 21 for the first blade, and the cocking member 21 for the first blade located at the initial position in FIG. 2 is rotated in a clockwise direction against the biasing force of a spring, not shown. As such, the driving member 6 for the first blade, whose portion 6a to be pressed is pushed by the pressing portion 21b of the cocking member 21 for the first blade, is rotated in a clockwise direction against the biasing force of a driving spring, not shown, in FIG. 1. Consequently, the first blade is actuated by the driving pin 6b, and the blade components 31–35 folded and housed at the upper place of the aperture 1a are moved downward to close the aperture 1a. Immediately after the slit-forming blade component 35 begins to close the aperture 1a, the operating portion 6d of the driving member 6 for the first blade brings the switch A into an off condition.

After the aperture 1a is completely closed by the blade components 31–35, the position of rotation of the cocking member 21 for the first blade is detected through the minor hole 21d by the sensor A, and thereby the rotation of the motor 16 is stopped. For the cocking member 21 for the first blade, its cocked position refers to the case where the motor 16 is stopped in this way. At the instant of this stop, the iron piece member 9 of the driving member 6 for the first blade comes in contact with the electromagnet for the first blade, but this electromagnet is not energized. When the L signal is sent from the sensor A, a flash circuit is brought into a cocking condition in the case where a flash photographing mode is set, so that one preselected from the switches A and B is actuated. Such a cocking condition is shown in FIGS. 3 and 4. In the embodiment, if the sensor A is not brought into an on condition even when preset time has passed after the motor 16 is energized, a warning indication will be given on the assumption that some trouble is caused to the operation of a first blade system.

In this way, when the L signal is sent from the sensor A, the following operations are performed at preset time intervals immediately after that. First, the two electromagnets are energized; second, the two motors 16 and 24 are also energized; and finally, power to the electromagnet for the first blade is disconnected and at the same time, the count of electric control time (which is time determined in accordance with a photographing condition such as light from the object, but does not necessarily agree with effective exposure time because of a time difference in operation start between the first blade and the second blade) is started through an exposure time control circuit. Thus, when the two electromagnets are energized as mentioned above, the iron piece members 9 and 10 of the driving members 6 and 7 which have merely come in contact with individual electromagnets are now attracted and retained by the individual electromagnets.

Subsequently, the two motors 16 and 24 are energized and thereby are rotated in the same direction as the above description. In the embodiment, however, the motors may be reversed, depending on the shapes of the cams 20a and 27a. When the motors are operated to rotate the gear 20 and 27, the cocking members 21 and 28 are restored to the initial positions of FIG. 2 in accordance with the operations of the cams 20a and 27a. However, the driving members 6 and 7, whose iron piece members 9 and 10 are already attracted and retained by the individual electromagnets, are not restored to the states of FIG. 1. In this case, however, the states of the driving members 6 and 7 are not that they are not entirely moved, but that they are moved very slightly because of constructions for mounting the iron piece members 9 and 10. When the cocking members 21 and 28 are restored to the initial positions, their restorations are detected through the major holes 21c and 28c by the sensors A and B, and the motors 16 and 24 are stopped. Also, although the output signals of the sensors A and B in this case are the same as in the case where the power is turned on, the shutter is designed so that the stop functions of the motors 16 and 24 are not exercised only when the power is turned on.

After that, as mentioned above, when power to the electromagnet for the first blade is disconnected, a predetermined attractive force caused by the electromagnet for the first blade is lost. In this case, the driving member 6 for the first blade is rotated in a counterclockwise direction, from a state of FIG. 3, by the biasing force of a driving spring, not shown, to move the five blade components 31–35 of the first blade upward while increasing the amount of mutual superposition, and causes the slit-forming edge of the slit-forming blade component 35 to open the aperture 1a. When the aperture 1a is fully opened (strictly speaking, in most cases, immediately before it is fully opened), the switch A is actuated by the operating portion 6d of the driving member 6 for the first blade and is brought into an on condition. Thus, when a case is selected in which the flash photographing mode is set and the flash is emitted immediately after the aperture 1a is fully opened, a flash circuit is energized to emit light by turning the switch A on. Immediately after the switch A is turned on, the driving pin 6b of the driving member 6 for the first blade abuts on the shock absorbing member 4 to stop the driving member 6 for the first blade, and the five blade components 31–35 are housed at the upper place of the aperture 1a.

In this way, when the aperture 1a is fully opened and then the count of the electric control time by the exposure time control circuit is completed, power to the electromagnet for the second blade is disconnected. As such, the driving member 7 for the second blade is rotated in a counterclockwise direction, from a state of FIG. 3, by the biasing force of a driving spring, not shown, to move upward the four blade components 36–39 of the second blade which are housed at the lower place of the aperture 1a, while reducing the amount of mutual superposition, and causes the slit-forming edge of the slit-forming blade component 39 to close the aperture 1a. However, immediately after the operation is started and before the slit-forming blade component 39 begins to close the aperture 1a, the switch B is turned on by the operating portion 7d of the driving member 7 for the second blade. Hence, when a case is selected in which the flash photographing mode is set and the flash is emitted immediately before the second blade begins to close the aperture 1a, the flash circuit is energized to emit light by turning the switch B on.

Then, immediately after the aperture 1a is closed by the four blade components 36–39 of the second blade, the driving pin 7b of the driving member 7 for the second blade abuts on the shock absorbing member 5 to thereby stop the driving member 7 for the second blade. The diagram of FIG. 1 refers also to a stopped state of the driving member 7, that is, a state brought about immediately after the exposure operation is completed. When the exposure operation is completed in this way, imaging information is transferred to a memory device in a closed state, and when this transfer is completed, the motor 24 is rotated by a corresponding signal. The cocking member 28 for the second blade is thus rotated clockwise through a gear train mentioned above and the cam 27a in FIG. 2, and the sensor B is brought into an off condition.

When the cocking member 28 for the second blade is rotated as described above, the driving member 7 for the second blade is also rotated in a clockwise direction against the biasing force of a driving spring, not shown. Consequently, the four blade components 36–39 of the second blade are moved downward while increasing the amount of mutual superposition to open the aperture 1a. Immediately before the driving member 7 for the second blade is stopped after the aperture 1a is fully opened, the switch B is brought into the off condition by the operating portion 7d. Moreover, immediately after that, the sensor B detects the position of rotation of the cocking member 28 for the second blade through the minor hole 28d to stop the rotation of the motor 24. As a result, restoration to an already described state, namely a state that the image of the object can be observed through the electronic view finder, is assured. Therefore, the next photographing becomes possible.

However, when the next photographing is not performed, the power is turned off in this state. In doing so, a delay circuit is energized and the current can be supplied only for a certain time period. Hence, the motor 24 is rotated by an off signal, and the cocking member 28 for the second blade is also rotated in accordance with the operation of the cam 27a by the biasing force of a spring, not shown, until it reaches a state of FIG. 2. For this, the intermediate member 8 is also rotated in accordance with the operation of the cocking member 28 for the second blade by the basing force of a spring, not shown, until it reaches a state of FIG. 1. Since in this case the current is not supplied to the electromagnet for the second blade, the driving member 7 for the second blade is also rotated by the biasing force of a driving spring, not shown, until it reaches a state of FIG. 1, and the four blade components 36–39 of the second blade which are housed at the lower place of the aperture 1a are moved upward to close the aperture 1a.

At the initial stage of these operations, the switch B is turned on and the sensor B is turned off. When the aperture 1a reaches a closed state, the sensor B detects the major hole 28c of the cocking member 28 for the second blade to stop the motor 24 so that a state of FIGS. 1 and 2 is brought about. Also, the above description is given on the assumption that the flash photographing is performed, but where photographing is performed without using a flash device, the flash circuit is configured, as a matter of course, so that it is not operated by the on and off conditions of the switches A and B. As is well known, it is common practice that the exposure operation in this case is carried out in such a way that before the opening operation of the aperture 1a by the first blade is completed, the second blade begins to close the aperture 1a.

Figure 6:
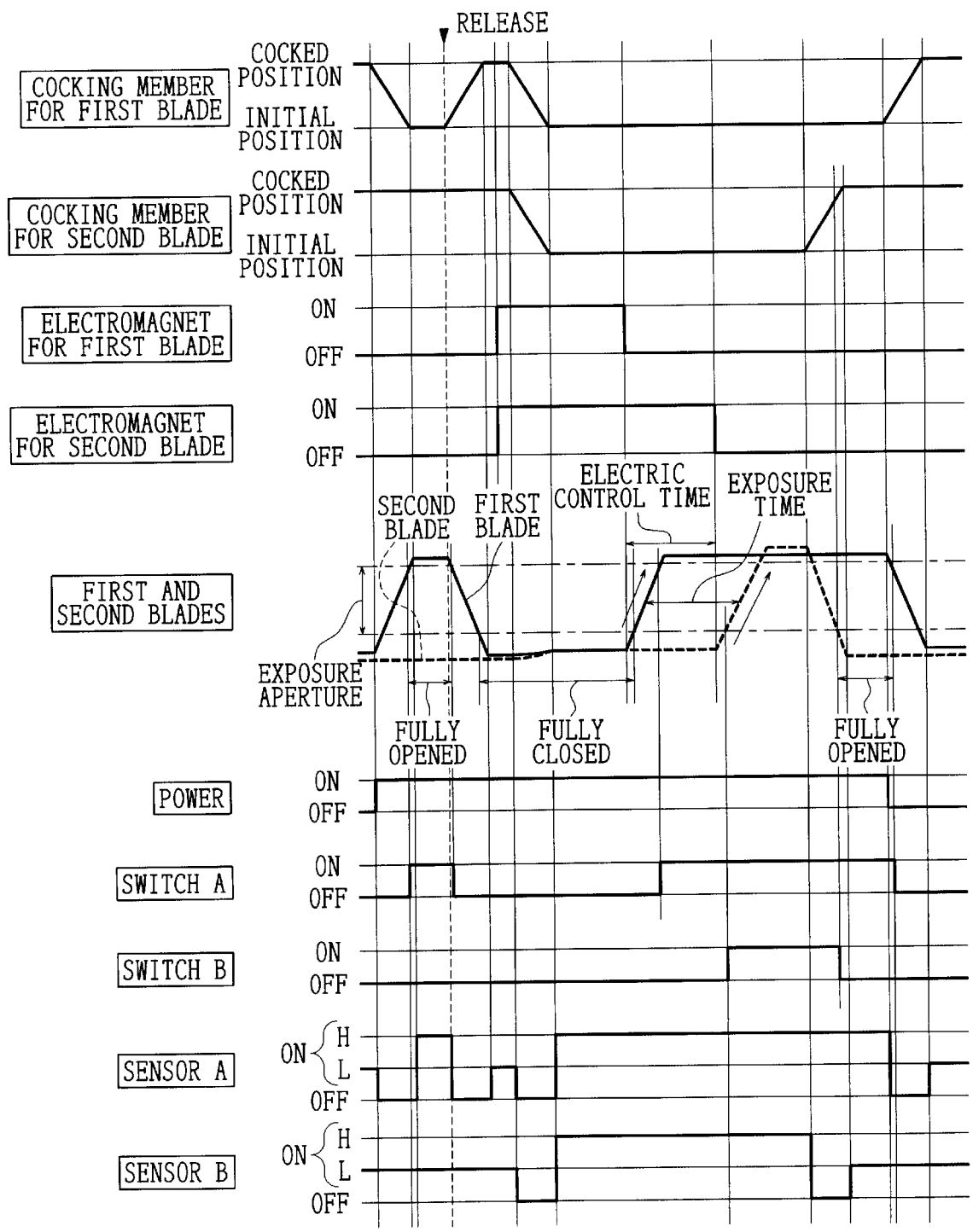
FIG. 6 is a timing chart in the case where the same mechanism as in the embodiment is actuated in a different sequence.

Subsequently, the operation of the mechanism shown in FIGS. 1–4 which is different from the case of FIG. 5 will be explained below with reference to FIG. 6. In this case, the diagrams of FIGS. 1 and 2 correspond to a state brought about immediately after the exposure operation is completed, and the diagrams of FIGS. 3 and 4 correspond to the cocking condition and the off condition of the power. Also, in FIG. 6, the switches A and B and the sensors A and B are the same as those described in FIG. 5.

Reference is first made to the case where the diagrams of FIGS. 3 and 4 show not the cocking condition, but the off condition of the power. In this case, as seen from FIG. 3, the aperture 1a is covered with the five blade components 31–35 of the first blade so that unnecessary degradation of the performance of photoelectric conversion of the image sensor is suppressed without providing the lens cap or the lens barrier. When the power is turned on in this state, both the two switches A and B, not shown, are in off conditions. On the other hand, both the sensors A and B are brought into on conditions to emit L signals. Consequently, it is confirmed that the cocking member 21 for the first blade and the cocking member 28 for the second blade lie at the cocked positions, and when the power is turned on, the current is supplied to the motor 16 alone.

When the motor 16 is rotated in this way, the gear train is rotated and thus the cocking member 21 for the first blade is rotated counterclockwise in accordance with the operation of the cam 20a, from a state of FIG. 4, by the basing force of a spring, not shown. Since in this case the current is not yet supplied to the electromagnet for the first blade, the driving member 6 for the first blade is also rotated counterclockwise in accordance with the operation of the cocking member 21 for the first blade by the biasing force of a driving spring, not shown, in FIG. 3. As such, the five blade components 31–35 of the first blade covering the aperture 1a are moved upward and begin to open the aperture 1a.

When the aperture 1a is fully opened, the operating portion 6d of the driving member 6 for the first blade brings the switch A into an on condition. In this case, even though a case is selected in which the flash photographing mode is set and the flash is emitted when the switch A is turned on, the flash circuit does not function. After that, the sensor B detects the major hole 21c of the cocking member 21 for the first blade to thereby stop the motor 16. In this way, as a result that the aperture 1a is fully opened, the observation of the image of the object through the electronic view finder becomes possible.

Subsequently, when the release button is pushed for photographing, the motor 16 is rotated by a corresponding signal, and cocking member 21 for the first blade, whose portion 21a to be pressed is pushed by the cam 20a, is rotated, and the driving member 6 for the first blade is rotated against the biasing force of a driving spring, not shown. Hence, the first blade is actuated by the driving pin 6b, so that the blade components 32–35 housed at the upper place of the aperture 1a are moved downward to close the aperture 1a. Immediately after the slit-forming blade component 35 begins to close the aperture 1a, the operating portion 6d of the driving member 6 for the first blade brings the switch A into an off condition.

After the aperture 1a is completely blocked by the blade components 31–35, the minor hole 21d of the cocking member 21 for the first blade is detected by the sensor A, and thereby the rotation of the motor 16 is stopped. At the instant of this stop, the electromagnet for the first blade is not energized. When the L signal is output from the sensor A, the flash circuit is brought into the cocking condition and one preselected from the switches A and B functions in the case where the flash photographing mode is set. The diagrams of FIGS. 3 and 4 refers to such a cocking condition.

In this way, when the L signal is output from the sensor A, the following operations are performed at preset time intervals immediately after that. First, the two electromagnets are energized; second, the two motors 16 and 24 are also energized; and finally, power to the electromagnet for the first blade is disconnected and at the same time, the count of the electric control time is started through the exposure time control circuit. When the two electromagnets are thus energized as mentioned above, the iron piece members 9 and 10 of the driving members 6 and 7 which have merely come in contact with individual electromagnets are now attracted and retained by the individual electromagnets.

Subsequently, when the two motors 16 and 24 are energized, the cocking members 21 and 28 are restored to the initial positions of FIG. 2 in accordance with the operations of the cams 20a and 27a, respectively, rotated through the gear train. However, the driving members 6 and 7, whose iron piece members 9 and 10 are already attracted and retained by the individual electromagnets, maintains the states of FIG. 3. In this case, however, the states of the driving members 6 and 7 are not that they are not entirely moved, but that they are moved very slightly because of constructions for mounting the iron piece members 9 and 10. When the cocking members 21 and 28 are restored to the initial positions, their restorations are detected through the major holes 21c and 28c by the sensors A and B, and the motors 16 and 24 are stopped.

After that, when power to the electromagnet for the first blade is disconnected, the driving member 6 for the first blade is rotated in a counterclockwise direction, from a state of FIG. 3, by the biasing force of a driving spring, not shown, and the five blade components 31–35 of the first blade are moved upward and begin to open the aperture 1a. When the aperture 1a is fully opened, the switch A is actuated by the operating portion 6d of the driving member 6 for the first blade and is brought into an on condition. Thus, when a case is selected in which the flash photographing mode is set and the flash is emitted immediately after the aperture 1a is fully opened, the flash circuit is energized to emit light by turning the switch A on. Immediately after the switch A is turned on, the driving pin 6b of the driving member 6 for the first blade abuts on the shock absorbing member 4 to stop the driving member 6 for the first blade, and the five blade components 31–35 of the first blade are housed at the upper place of the aperture 1a.

After the aperture 1a is fully opened and preset time has passed, the count of the electric control time by the exposure time control circuit is completed, and then power to the electromagnet for the second blade is disconnected. As such, the driving member 7 for the second blade is rotated in a counterclockwise direction, from a state of FIG. 3, by the biasing force of a driving spring, not shown, and the four blade components 36–39 of the second blade which are housed at the lower place of the aperture 1a are moved upward to close the aperture 1a. In this case, before the slit-forming blade component 39 begins to close the aperture 1a, the switch B is turned on by the operating portion 7d of the driving member 7 for the second blade. Hence, when a case is selected in which the flash photographing mode is set and the flash is emitted immediately before the second blade begins to close the aperture 1a, the flash circuit is energized to emit light by turning the switch B on. Then, the driving pin 7b of the driving member 7 for the second blade abuts on the shock absorbing member 5 to thereby stop the driving member 7 for the second blade. The diagram of FIG. 1 refers to a stopped state of the driving member 7, that is, a state brought about immediately after the exposure operation is completed.

When the exposure operation is completed in this way, imaging information is transferred to the memory device in a closed state, and when this transfer is completed, the motor 24 is rotated by a corresponding signal. The cocking member 28 for the second blade is thus rotated clockwise through the gear train and the cam 27a in FIG. 2, and the sensor B is set to an off condition. When the cocking member 28 for the second blade is rotated, the driving member 7 for the second blade is also rotated in a clockwise direction against the biasing force of a driving spring, not shown, and the aperture 1a is opened by the four blade components 36–39 of the second blade. Immediately before the driving member 7 for the second blade is stopped after the aperture 1a is fully opened, the switch B is brought into an off condition by the operating portion 7d. Moreover, immediately after that, the sensor B detects the minor hole 28d of the cocking member 28 for the second blade to stop the motor 24. As a result, the image of the object can be observed through the electronic view finder, and all is restored to a state where the next photographing can be performed.

However, when the next photographing is not performed, the power is turned off in this state. In doing so, a delay circuit is energized and the current can be supplied only for a certain time period. Hence, the motor 16 is rotated by a corresponding off signal, and the portion 21a to be pressed, of the cocking member 21 for the first blade is pushed by the cam 20a. At this time, the current is not supplied to the electromagnet for the first blade. Therefore, the cocking member 21 for the first blade is rotated while rotating the driving member 6 for the first blade until it reaches a state of FIG. 3. In this case, the driving member 6 for the first blade is rotated against the biasing force of a driving spring, not shown, until it reaches a state of FIG. 4, and the five blade components 31–35 of the first blade incorporated at the upper place of the aperture 1a are moved downward to close the aperture 1a. At the initial stage of these operations, the switch A is turned off and the sensor A is also turned off. When the aperture 1a reaches a closed state, the sensor A detects the minor hole 21d of the cocking member 21 for the first blade to stop the motor 16 so that a state of FIGS. 3 and 4 is brought about.

Also, although in the above description a gear train composed of the gears 25, 26, and 27 and the cocking member 28 for the second blade are attached to the wall 1b of the shutter base plate 1, the wall 1b may be provided on the left side of the driving member 7 for the second blade in FIG. 1 so that the gear train (the gears 25–27) and the cocking member 28 for the second blade are mounted on the surface of the right side of the wall. By doing so, even though the intermediate member 8 is not provided, the cocking member 28 for the second blade is capable of rotating directly the driving member 7 for the second blade, which is advantageous for cost. Furthermore, since the position of the motor 24 can be shifted on the left side, the appearance of the entire shutter unit is improved and restriction on the design of a camera is lightened. The wall 1b, like the mounting member 11, may be provided as a member independent of the shutter base plate 1, and conversely, the mounting member 11, like the wall 1b, may be configured integrally with the shutter base plate 1. Consequently, where the placement of the wall 1b is changed, the mounting member 11 and the wall 1b can be constructed as the same member or part.

Recently, various motors with speed-reducing mechanisms have been known. When such a motor is used, the cam 20a or 27a, such as that in the embodiment, may be mounted directly to its output shaft. Also, although in the embodiment the cams 20a and 27a are used to rotate the cocking members 21 and 28 clockwise or counterclockwise, the cocking members 21 and 28 can be rotated without using the cams 20*a* and 27*a*. The present invention is not limited to the structure that the two motors are mounted on the shutter base plate. When one of the motors, or both, are mounted to the camera body through proper transmission mechanisms, this may be advantageous for camera design. However, when the motors are used only for the operations of the cocking members 21 and 28, it is often advantageous that the motors are mounted to the shutter base plate 1.

The present invention, as mentioned above, has the features that the housing areas of the first blade and second blade are not increased, and it is possible that when the power of the camera is turned off, the imaging surface is covered by the first blade or the second blade, while when the power is on, the imaging surface is exposed, irrespective of the focal-plane shutter for digital still cameras in which the first blade and the second blade are actuated in turn by the individual driving springs as driving sources in photography and the imaging surface is exposed through a slit provided by the blades,

What is claimed is:

1. A focal-plane shutter for digital still cameras, comprising:
   a first blade covering an exposure aperture only immediately before an exposure operation is performed, after release, but removed from exposure aperture in other cases even when a power of a camera is turned off;
   a driving member for said first blade having an iron piece member, connected to said first blade and actuated by a biasing force of a driving spring for said first blade in an exposure operation;
   an electromagnet for said first blade for attracting and retaining said iron piece member of said driving member for said first blade by a supply of current immediately after said release and actuating said driving member for said first blade by said driving spring for said first blade when said current is interrupted;
   a cocking member for said first blade whose actuation is controlled between an initial position and a cocked position thereof by a first motor, actuating said driving member for said first blade against a biasing force of said driving spring for said first blade when actuated from said initial position to said cocked position, and actuated from said cocked position to said initial position only immediately after said current is supplied to said electromagnet for said first blade;
   a second blade covering said exposure aperture when said power is turned off and immediately after said exposure operation is completed, but removed from said exposure aperture in other cases;
   a driving member for said second blade having an iron piece member, connected to said second blade and actuated by a biasing force of a driving spring for said second blade in said exposure operation;
   an electromagnet for said second blade for attracting and retaining said iron piece member of said driving member for said second blade by a supply of current immediately after said release and actuating said driving member for said second blade by said driving spring for said second blade when said current is interrupted; and
   a cocking member for said second blade whose actuation is controlled between an initial position and a cocked position thereof by a second motor, actuating said driving member for said second blade against a biasing force of said driving spring for said second blade when actuated from said initial position to said cocked position, and actuated from said cocked position to said initial position only immediately after said current is supplied to said electromagnet for said second blade and when said power of said camera is turned off.

2. A focal-plane shutter for digital still cameras, comprising:
   a first blade covering an exposure aperture immediately before an exposure operation is performed and when a power of a camera is turned off, after release, but removed from said exposure aperture in other cases;
   a driving member for said first blade having an iron piece member, connected to said first blade and actuated by a biasing force of a driving spring for said first blade in an exposure operation;
   an electromagnet for the first blade for attracting and retaining said iron piece member of said driving member for said first blade by a supply of current immediately after said release and actuating said driving member for said first blade by said driving spring for said first blade when said current is interrupted;
   a cocking member for said first blade whose actuation is controlled between an initial position and a cocked position thereof by a first motor, actuated from said initial position to said cocked position immediately before said exposure operation is performed and when said power of said camera is turned off, after said release, to actuate said driving member for said first blade against a biasing force of said driving spring for said first blade and actuated from said cocked position to said initial position when said power of said camera is turned on and immediately after said current is supplied to said electromagnet for said first blade;
   a second blade covering said exposure aperture only immediately after said exposure operation is completed, but removed from said exposure aperture in other cases even when said power is turned off;
   a driving member for said second blade having an iron piece member, connected to said second blade and actuated by a biasing force of a driving spring for said second blade in said exposure operation;
   an electromagnet for said second blade for attracting and retaining said iron piece member of said driving member for said second blade by a supply of current immediately after said release and actuating said driving member for said second blade by said driving spring for said second blade when said current is interrupted; and
   a cocking member for said second blade whose actuation is controlled between an initial position and a cocked position thereof by a second motor, actuating said driving member for said second blade against a biasing force of said driving spring for said second blade when actuated from said initial position to said cocked position, and actuated from said cocked position to said initial position only immediately after said current is supplied to said electromagnet for said second blade.

3. A focal-plane shutter for digital still cameras according to claim 1 or 2, further comprising a first sensor for detecting a working position of said cocking member for said first blade to stop a rotation of said first motor and a second sensor for detecting a working position of said cocking member for said second blade to stop a rotation of said second motor.

4. A focal-plane shutter for digital still cameras according to claim 1 or 2, further comprising a first switch for synchro flash operated at a final stage of said exposure operation of said driving member for said first blade by said driving member for said first blade and a second switch for synchro flash operated at an initial stage of said exposure operation of said driving member for said second blade by said driving member for said second blade, one of said first switch and said second switch being selected so that flash photographing is performed.

* * * * *